US008190511B2

(12) United States Patent
Ericksen

(10) Patent No.: US 8,190,511 B2
(45) Date of Patent: May 29, 2012

(54) SYSTEMS, METHODS AND COMPUTER PROGRAM PRODUCTS FOR OFFERING CONSUMER LOANS HAVING CUSTOMIZED TERMS FOR EACH CUSTOMER

(75) Inventor: Brian Ericksen, East Preston (GB)

(73) Assignee: American Express Travel Related Services Company, Inc., New York, NY (US)

( * ) Notice: Subject to any disclaimer, the term of this patent is extended or adjusted under 35 U.S.C. 154(b) by 1747 days.

(21) Appl. No.: 09/972,785

(22) Filed: Oct. 5, 2001

(65) Prior Publication Data
US 2002/0123960 A1    Sep. 5, 2002

Related U.S. Application Data

(60) Provisional application No. 60/238,186, filed on Oct. 5, 2000.

(51) Int. Cl.
*G06Q 40/00*    (2006.01)

(52) U.S. Cl. .......................................... 705/38; 705/35
(58) Field of Classification Search .................. 705/14, 705/38, 35, 39
See application file for complete search history.

(56) References Cited

U.S. PATENT DOCUMENTS
6,405,181 B2 *   6/2002   Lent et al. ...................... 705/38
* cited by examiner

*Primary Examiner* — Ojo O Oyebisi
(74) *Attorney, Agent, or Firm* — Snell & Wilmer L.L.P.

(57) ABSTRACT

Systems, methods and computer program products take into account the amount, term, and type of consumer loan, as well as data relating to a customer's credit score, debt burden, and collateral, if any. The invention then calculates an expected probability of default for a loan to that customer, and calculate loan terms that will deliver a minimum return on equity (e.g., 18%) given the lender's capital structure and funding rates. These loan terms are then offered to the customer. The customized loan terms include annual percentage rate of the loan, or a yearly fee or loan amount.

14 Claims, 8 Drawing Sheets

SYSTEMS, METHODS AND COMPUTER PROGRAM PRODUCTS FOR OFFERING CONSUMER LOANS HAVING CUSTOMIZED TERMS FOR EACH CUSTOMER

RELATED APPLICATION DATA

The present invention claims priority from U.S. Provisional Patent Application Ser. No. 60/238,186, filed on Oct. 5, 2000, titled "Systems, Methods and Computer Program Products For Offering Consumer Loans Having Customized Terms For Each Borrower", the entire contents of which are incorporated herein by reference.

FIELD OF THE INVENTION

The present invention relates to loans, and more particularly, to systems, methods and computer program products for offering loans having customized loan terms.

BACKGROUND OF THE INVENTION

Typically, lenders, such as banks, credit card companies and the like, offer loans to consumers based upon a calculation of the rate of return for loans given a certain level of risk. Because this calculation is a highly subjective process, lenders will ensure that loans are appropriately priced for a large pool of applicants to ensure that a minimum return will be met for over all loans. Therefore, the credit process begins with a formulation of strategy on how to allocate credit among customers and products to obtain the highest level of return for a given level of risk. This is generally a very structured, quantitative process where credit scores are calculated to estimate the expected default rate of a customer based on data from loan applications and credit bureaus. Credit products are then structured having a limited set of terms and pricing points depending upon an individual customer's credit score, so that groups of customers having similar credit scores will receive the same loan terms. Thus, the conventional wisdom is to price pools of loans and recoup returns by selling products in large volume.

A problem with such conventional methods and systems for offering loans is that less creditworthy customers tend to apply in greater numbers. Therefore, credit products must be priced to cover this phenomenon so that a return is ensured despite the potential of default for a large number of customers. Therefore, credit terms are typically priced so that customers with higher credit scores subsidize the less creditworthy customers. This typically makes a product less attractive to customers having higher credit, which amplifies the problem, as less favorable credit terms are generally unattractive to those with high credit.

What is therefore needed are systems, methods and computer program products for determining and setting loan terms for each individual customer to cover that customer's risk, so that creditworthy customers are not given unattractive terms to subsidize less creditworthy customers.

SUMMARY OF THE INVENTION

Systems, methods and computer program products according to the present invention take into account the amount, term, and type of customer loan, as well as data relating to a customer's credit score, debt burden, and collateral, if any. The present invention then calculates an expected probability of default for a loan to that customer, and calculates custom loan terms that will deliver a minimum return on equity (e.g., 18%) given the lender's capital structure and funding rates. These loan terms are then offered to the customer. According to one aspect of the invention, the custom loan terms include annual percentage rate of the loan. According to another aspect of the invention, the custom loan terms include yearly fee or loan amount.

According to one embodiment of the present invention, there is disclosed a method for determining individually customized loan terms for a customer. The method includes accepting customer credit application data corresponding to the customer, and accessing credit bureau data corresponding to the customer, where the credit bureau data contains a credit rating for the customer. The method further includes calculating an expected probability of default for a loan to the customer based at least in part upon the customer credit application data and the credit bureau data, and determining customized loan terms that deliver a minimum return on equity for a lender, based at least in part upon a measurement of likelihood that the customer will default on a loan, the lender's capital structure, and funding rates available to the lender.

According to one aspect of the invention, the method includes recalculating the customized loan terms for a different term where the customer does not accept an offer for the loan. According to another aspect of the invention, determining customized loan terms includes determining a required return on capital for the lender and calculating a required return on risk-adjusted assets (RORAA) for the lender. According to yet another aspect of the invention, accessing credit bureau data corresponding to the customer comprises receiving credit bureau data representing the likelihood for the customer to default on a loan.

According to the method, determining customized loan terms that deliver a minimum return on equity for a lender can also include determining customized loan terms for an unsecured loan to the customer. Additionally, calculating an expected probability of default for a loan to the customer may be based at least in part upon the customer's risk from debt burden. Moreover, determining customized loan terms can include determining customized loan terms based at least in part upon overhead incurred by the lender.

According to another embodiment of the invention, there is disclosed a system for offering a customer loan terms individually customized for the customer. The system includes a custom loan manager accessible by the customer via a computer, and at least one credit bureau in communication with the custom loan manager. The custom loan manager includes processing instructions for accepting customer credit application data corresponding to the customer, accessing credit bureau data corresponding to the customer, calculating an expected probability of default for a loan to the customer based at least in part upon the customer credit application data and the credit bureau data, and determining customized loan terms that deliver a minimum return on equity for the lender, based at least in part upon a measurement of likelihood that the customer will default on a loan, the lender's capital structure, and funding rates available to the lender.

According to yet another embodiment of the invention, there is disclosed a computer program product for use with a data processing system for determining customized loan terms for a customer. The computer program product includes a computer usable medium having computer-readable code means embodied in said medium, the computer-readable code means including computer-readable code means for calculating an expected probability of default for a loan to the customer based at least in part upon customer credit application data received from the consumer and credit bureau data associated with the consumer and received from a credit bureau, and computer-readable code means for determining customized loan terms that deliver a minimum return on equity for a lender, based at least in part upon a measurement of likelihood that the customer will default on a loan, the lender's capital structure, and funding rates available to the lender.

A unique aspect of the present invention is that it prices customers as individuals, rather than as one of a pool of customers, such that individual loan terms may be customized for each customer. Thus, the present invention offers an individual risk based pricing model that makes the loan process more objective by introducing the same level of rigor to the pricing of loan terms as is in the development of a credit score. Therefore, instead of offering one lending product, or several small variations, to the mass market, the present invention allows for mass customization where each customer's loan is unique in price, amount, and terms to that customer.

BRIEF DESCRIPTION OF THE DRAWINGS

Figure 1:
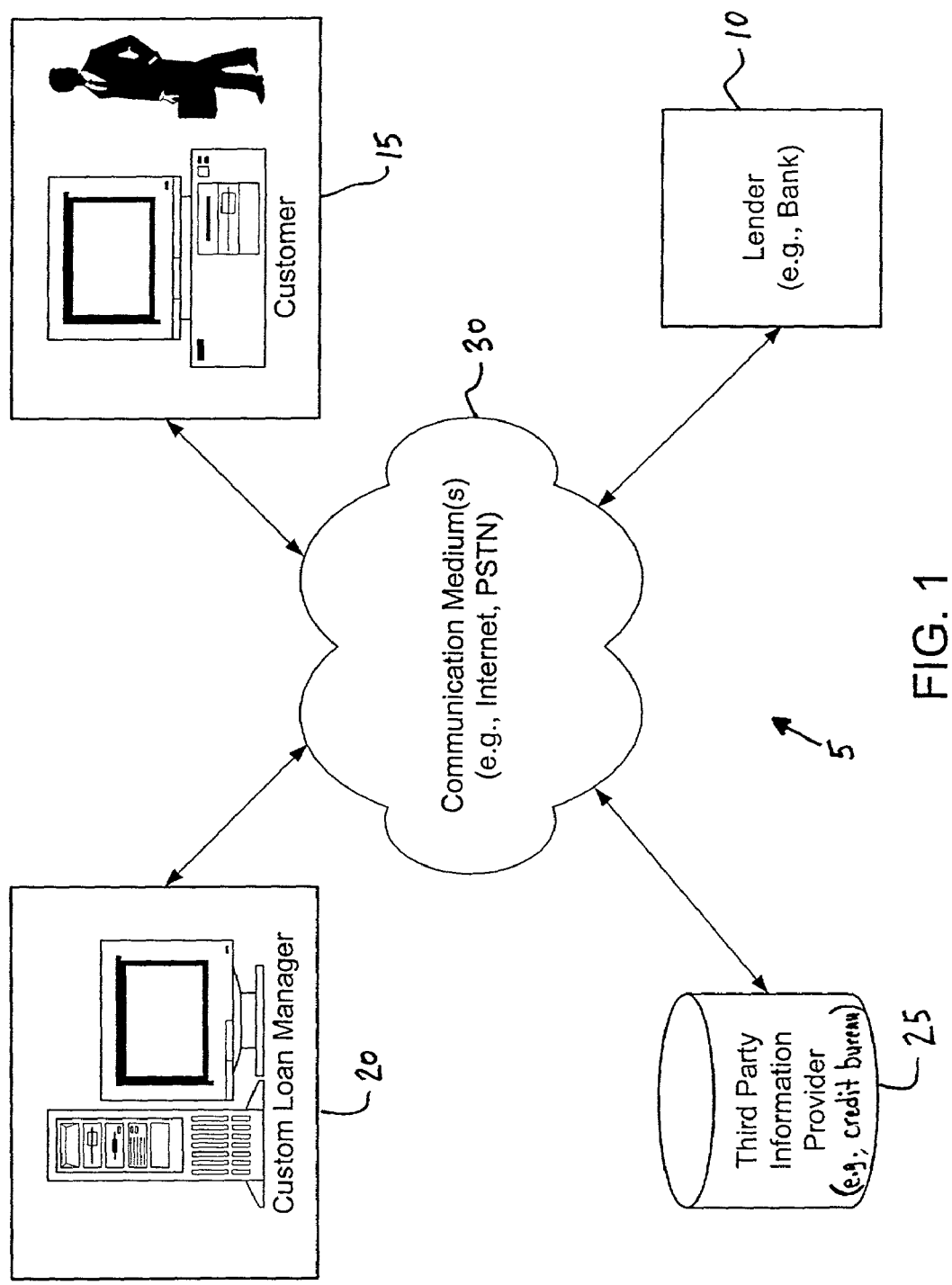

Having thus described the invention in general terms, reference will now be made to the accompanying drawings, which are not necessarily drawn to scale, and wherein:

FIG. 1 shows a block diagram of a customized loan system, according to one embodiment of the present invention.

Figure 2:
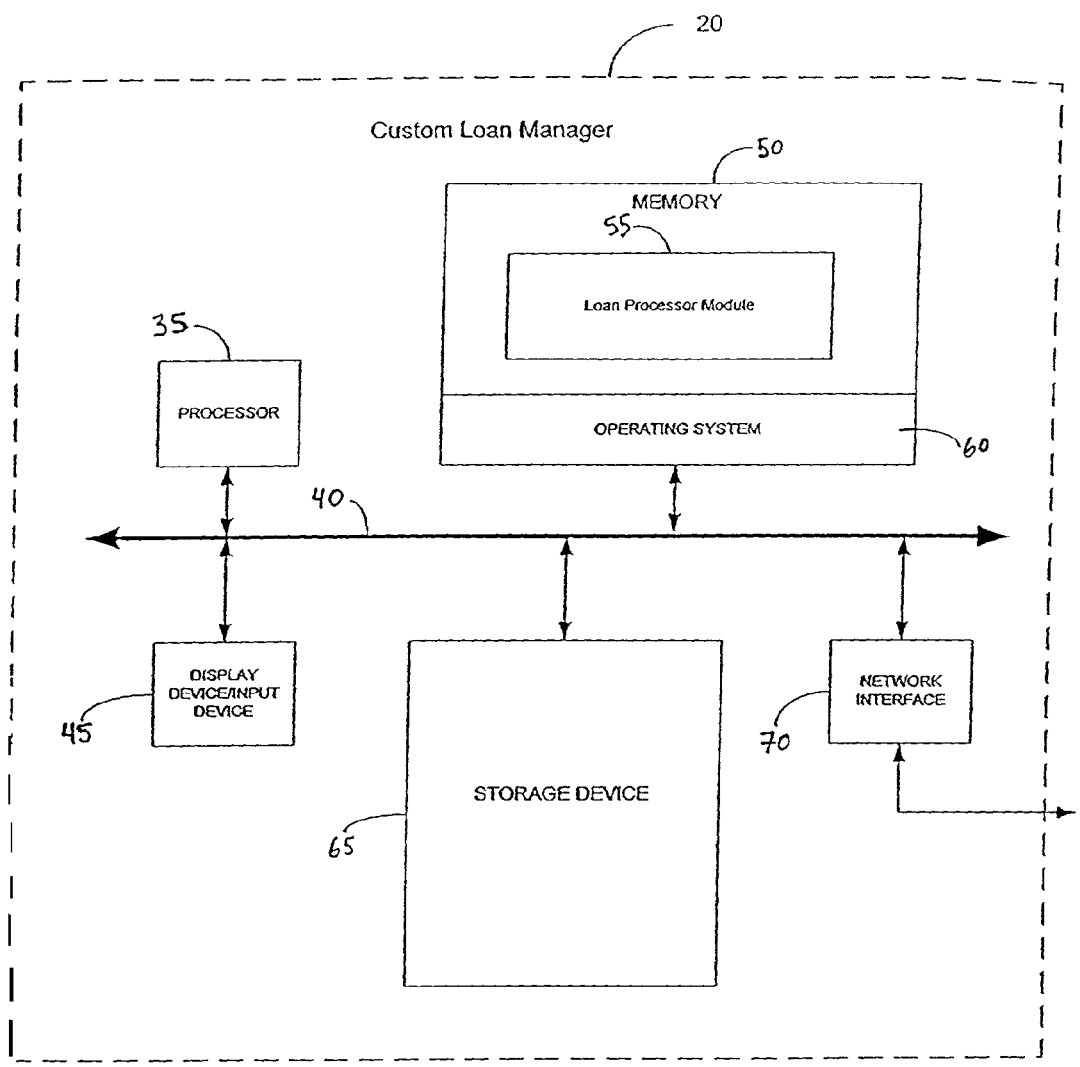

FIG. 2 shows a block diagram of the custom loan manager illustrated in FIG. 1, according to one embodiment of the present invention.

Figure 3:
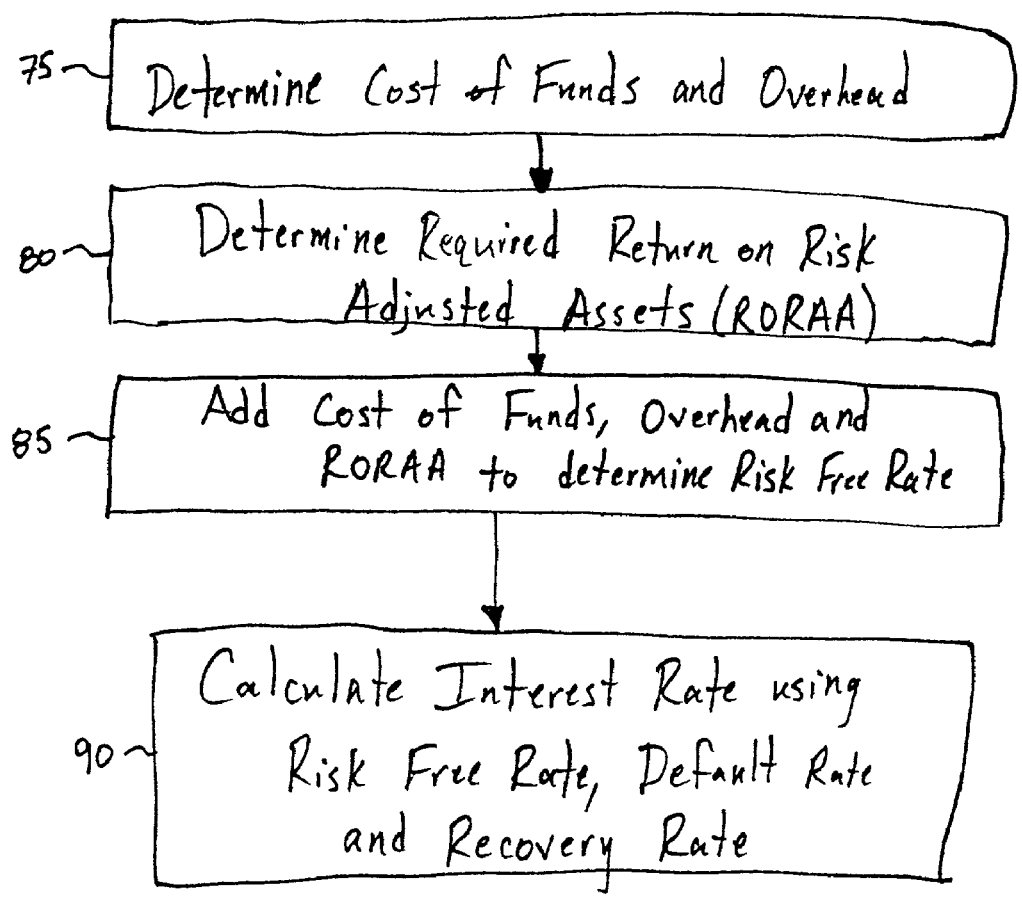

FIG. 3 shows a block diagram flow chart illustrating the calculation of personalized loan terms given an expected default rate, according to one aspect of the present invention.

Figure 4:
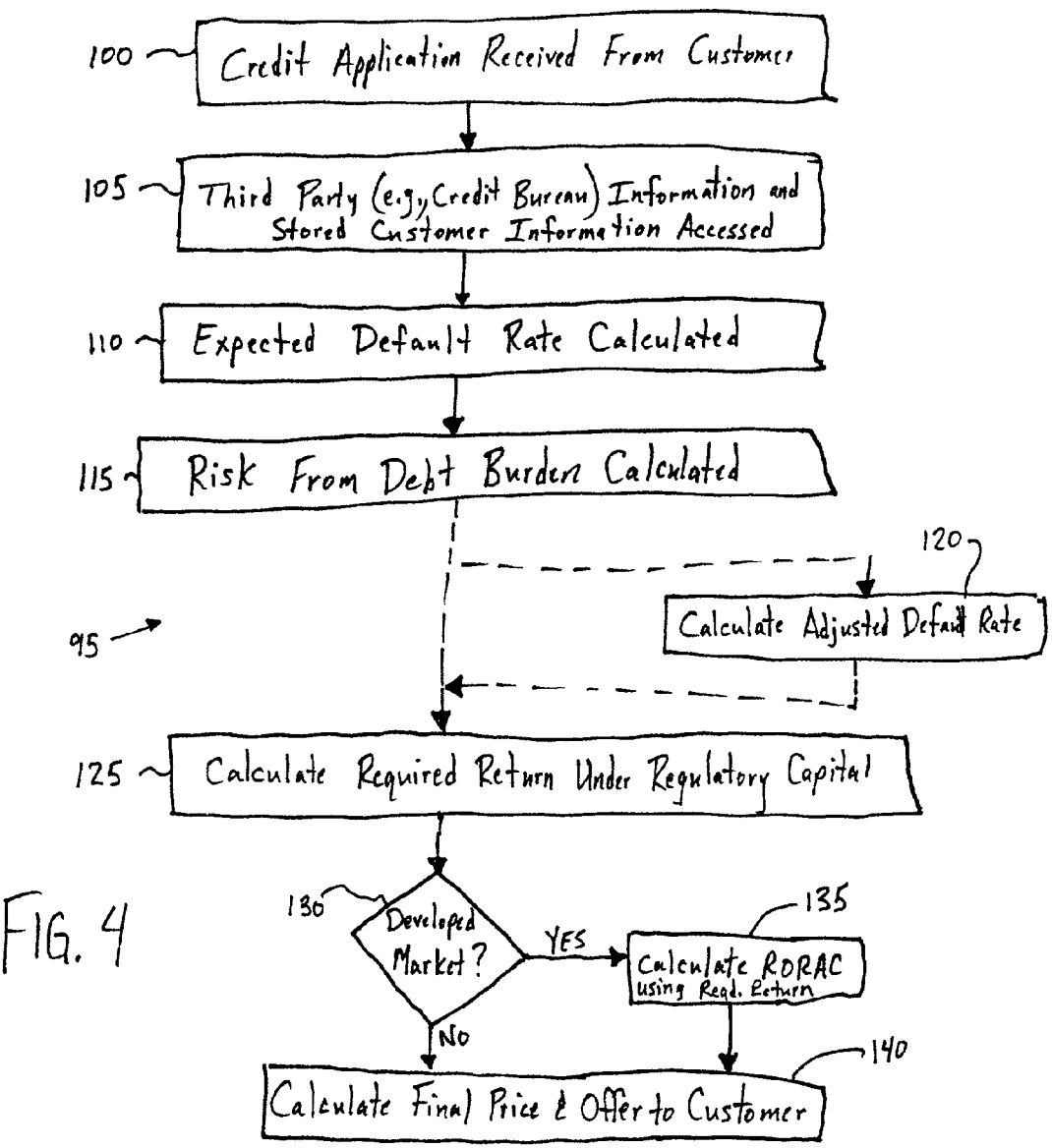

FIG. 4 shows a block diagram flow chart illustrating the calculation of personalized loan terms for unsecured installment loans and unsecured lines of credit, according to one aspect of the present invention.

Figure 5:
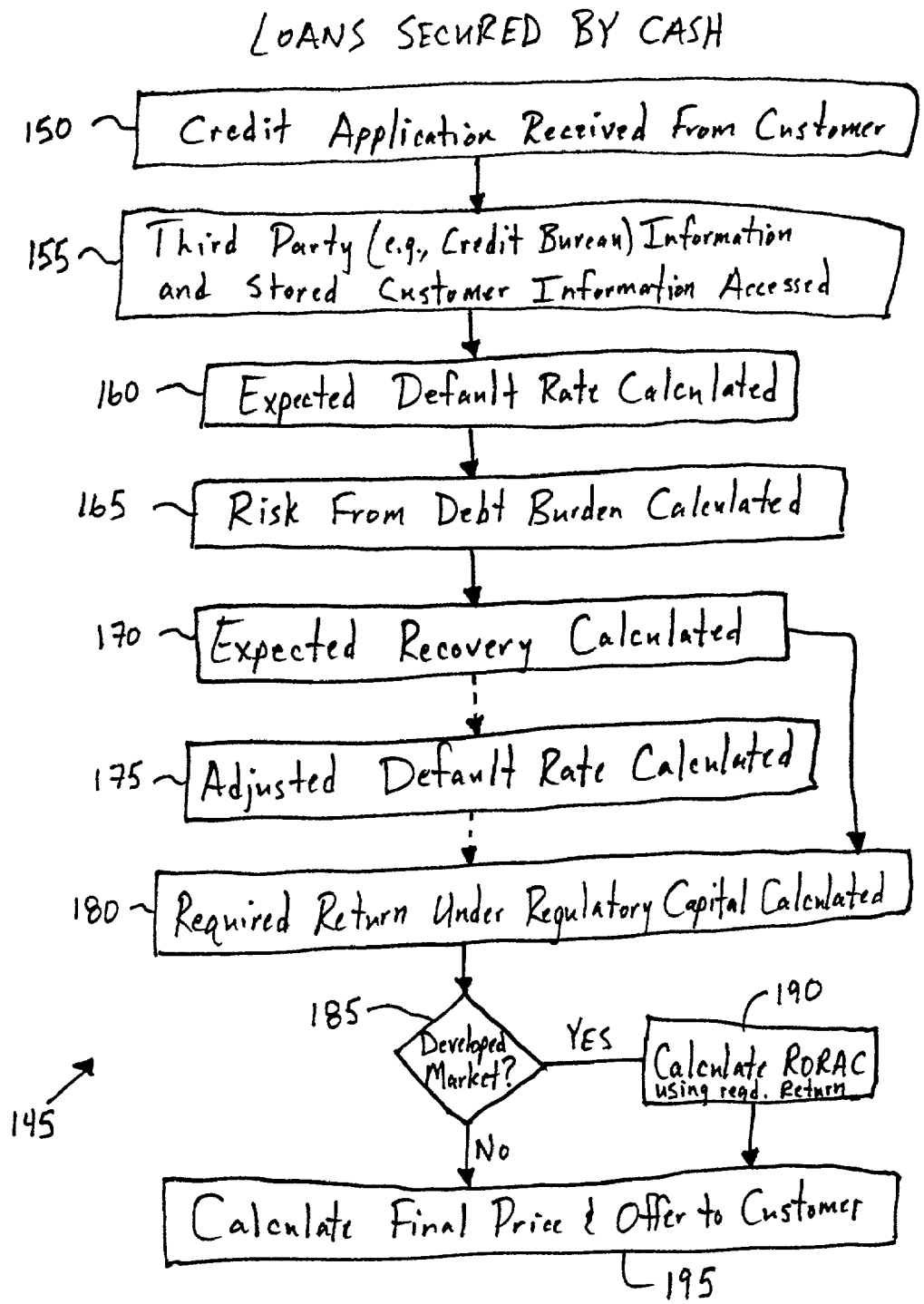

FIG. 5 shows a block diagram flow chart illustrating the calculation of personalized loan terms for loans secured by cash, according to one aspect of the present invention.

Figure 6:
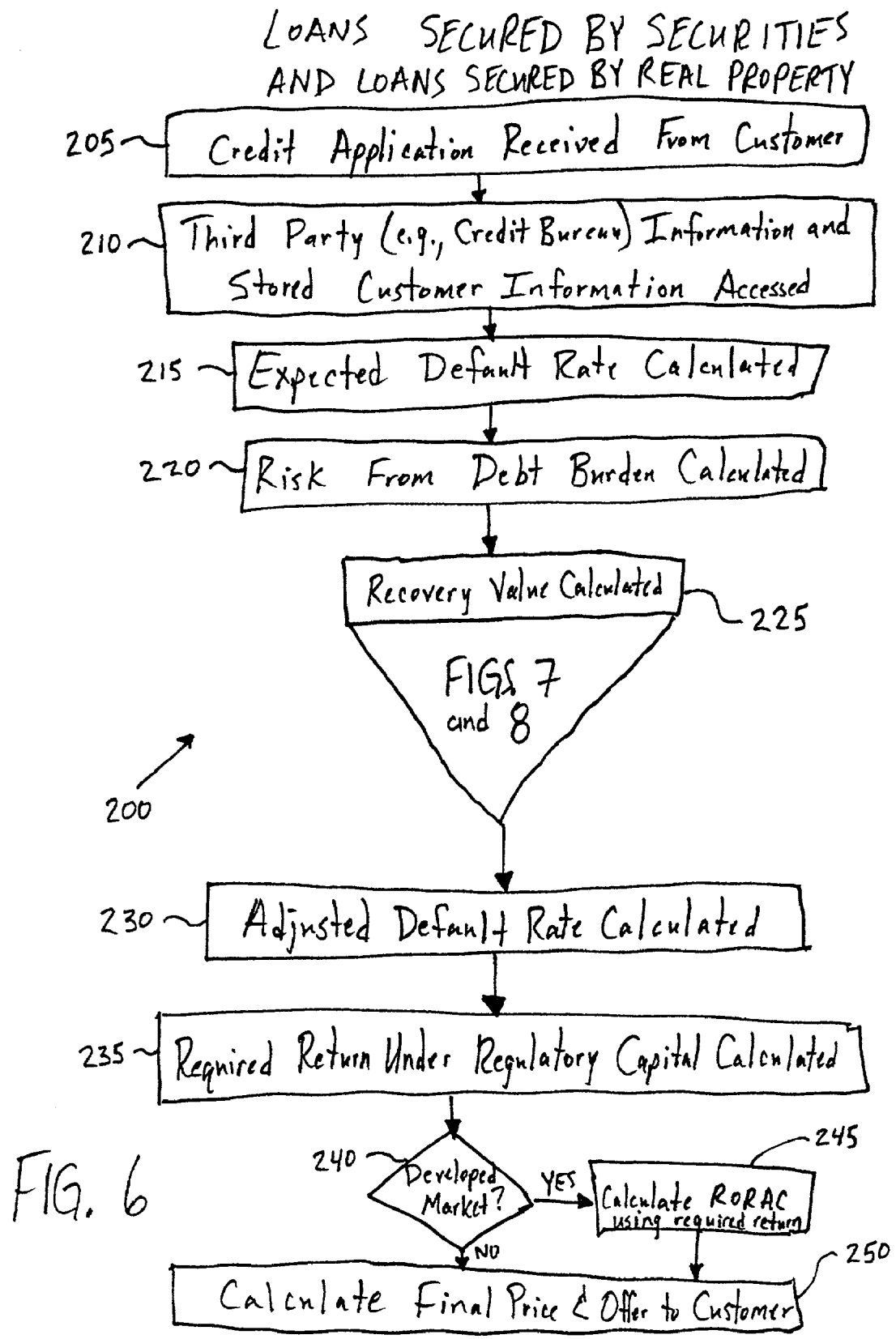

FIG. 6 shows a block diagram flow chart illustrating the calculation of personalized loan terms for loans secured by securities and loans secured by real property, according to one aspect of the present invention.

Figure 7:
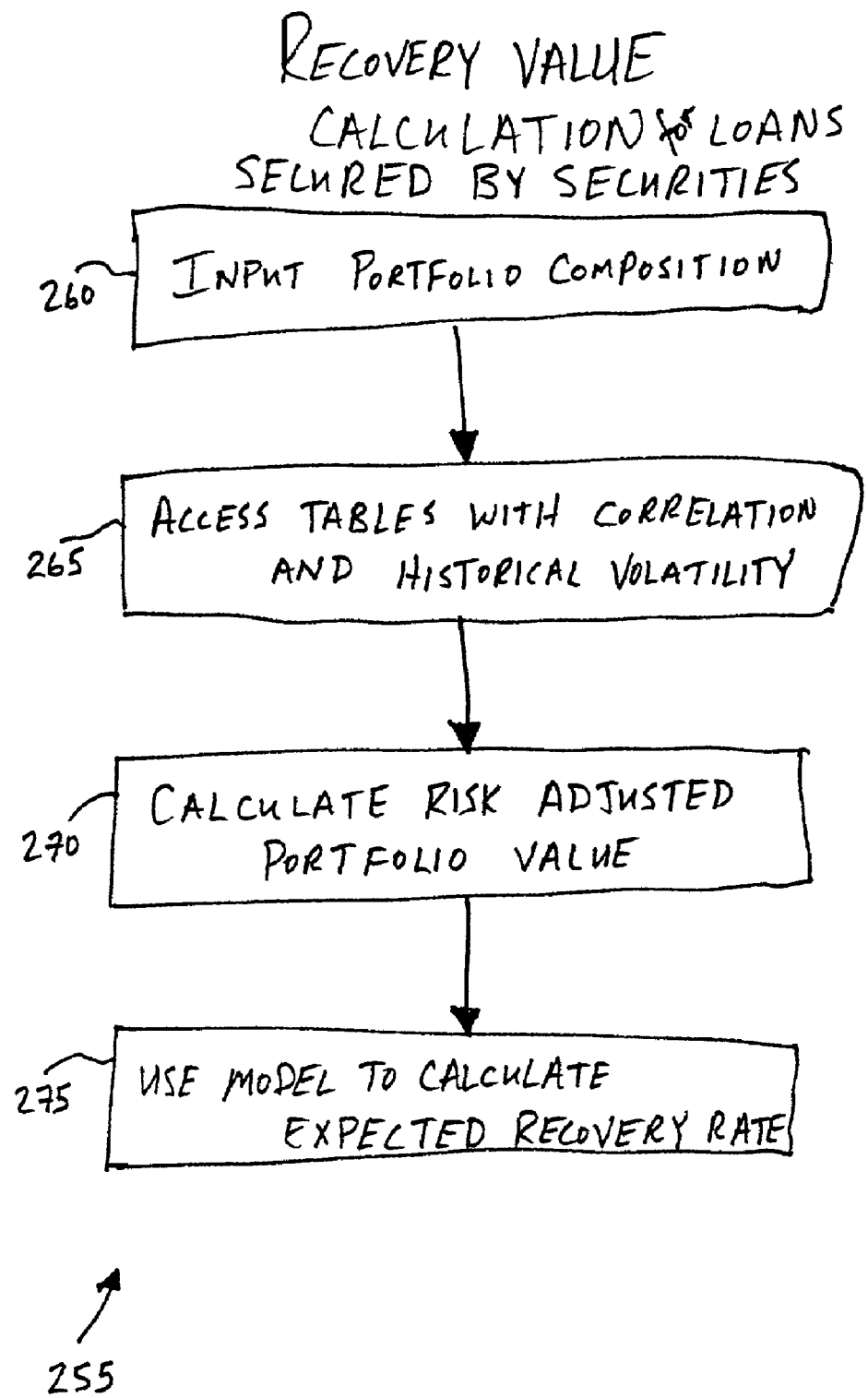

FIG. 7 shows a block diagram flow chart illustrating the calculation of recovery value for loans secured by securities, according to one aspect of the present invention.

Figure 8:
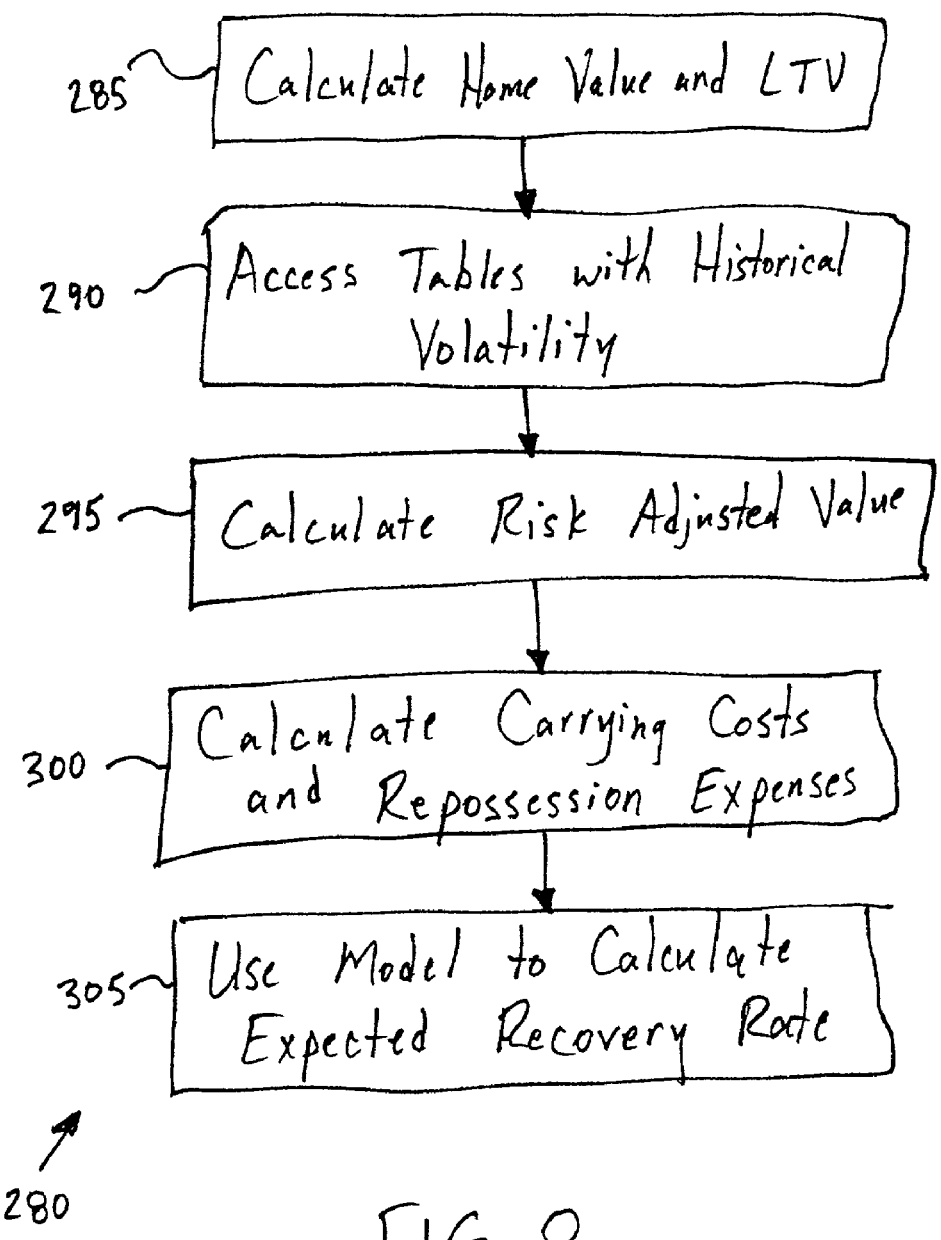

FIG. 8 shows a block diagram flow chart illustrating the calculation of recovery value for loans secured by real property, according to one aspect of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of ordinary skill in the art, the present invention may be embodied as a method, a data processing system, or a computer program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the storage medium. Any suitable computer-readable storage medium may be utilized including hard disks, CD-ROMs, optical storage devices, or magnetic storage devices.

The present invention is described below with reference to block diagrams and flowchart illustrations of methods, apparatus (i.e., systems) and computer program products according to an embodiment of the invention. It will be understood that each block of the block diagrams and the flowchart illustrations, and combinations of blocks in the block diagrams and combinations of the blocks in the flowchart illustrations, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks of the flowchart, or clock or blocks of the diagrams.

Accordingly, blocks of the block diagrams and the flowchart illustrations support combinations of means for performing the specified functions, combinations of steps for performing the specified functions and program instruction means for performing the specified functions. It will also be understood that each block of the block diagrams and the flowchart illustrations, and combinations of the respective blocks, can be implemented by special purpose hardware-based computer systems which perform the specified functions or steps, or combinations of special purpose hardware and computer instructions.

According to one embodiment of the invention systems, methods and computer program products of the present invention can be utilized to offer customized loans for a number of loans, including both unsecured and secured loans. For instance, the present invention may be used with unsecured installment loans, unsecured lines of credit, loans secured by cash, loans secured by securities (e.g., equity, bonds, mutual funds, etc.), and loans secured by real property (e.g., home mortgages). However, it will be appreciated by one of ordinary skill in the art that the present invention may also be extended to additional types of loans other than those listed herein, such as for auto loans, charge cards, and revolving credit cards. Therefore, the examples used herein are intended as illustrative embodiments of the present invention, and are not intended to be limiting as to the scope of the present invention.

FIG. 1 shows a block diagram of a customized loan system 5 according to one embodiment of the present invention. The customized loan system 5 includes a lender 10, a customer 15, a custom loan manager 20, and a third party information provider 25. The system also includes one or more communication medium(s) 30 through which each of the components 10, 15, 20, 25 can communicate. The communication medium(s) 30 is representative of any network or networks through which customers and lenders communicate for the purchase and sale of loan products, including conventional telephone networks, computer networks, or the Internet. Although the individual components 10, 15, 20, 25 are illustrated as separate components communicating with the aid of the communication medium(s) 30, it should be appreciated that one or more of the components 10, 15, 20, 25 can reside on the same network. For instance, the custom loan manager 20 may be located on the same network as, and local to, the lender 10, such that the communication medium between the two components is a local area network (LAN). Additionally, according to another illustrative example, a customer 15 may be in communication with a lender 10 via an Internet connection where the lender 10 offers loans via a web page accessed by the customer through an Internet connection, such as provided by an Internet Service Provider (ISP). As will be appreciated by those of skill in the art, the modes of communication between the entities of the system 5 of FIG. 1 may be accomplished by any well known communication means, and are not limited to any particular means stated herein. Furthermore, although the present invention will be described herein relative to components in communication via the Internet, its application is not so limited and is intended to be used on any distributed system in which customers and lenders interact for the purpose of providing and obtaining loans.

According to one aspect of the invention, the custom loan manager 20 is accessible via the Internet and includes computer hardware and/or software for implementing the methods described herein, including the methods for producing customized loan terms for customers. FIG. 2 shows a block diagram of the custom loan manager 20 of FIG. 1, according to one embodiment of the present invention. The custom loan manager 20 generally includes a processor 35, bus 40, display device/input device 45, memory 50, storage device 65, and network interface 70. The processor 35 communicates with other elements within the custom loan manager 20 via a system interface or bus 40, and is responsible, along with an operating system 60 residing within the memory 50, for managing the functions of the custom loan manager 20. The display device/input device 45, for example, a keyboard or pointing device in combination with a monitor, receives and outputs, via a display, data produced or processed by the custom loan manager 20. For instance, as will be explained in detail with reference to FIGS. 3-8, the custom loan manager 20 produces customized loan terms that may be displayed to an operator of the custom loan manager 20 via the display device/input device 45. The display device can include a monitor, printer, personal digital assistant, or other well known device for displaying data to an operator. In addition to a display device/input device 45, the custom loan manager 20 includes a network interface 70 for interfacing and communicating with other network devices. Therefore, customized loan terms generated by the custom loan manager 20 may be transmitted to other network components via the network interface 70 in addition to being displayed on a display device/input device 45. Furthermore, the network interface 70 enables the custom loan manager 20 to receive data from third parties 25, such as credit bureaus, and from other systems local to the custom loan manager 20. As explained in detail below, this data can be used by the custom loan manager 20 to generate customized loan terms for customers.

The memory 50 located within the custom loan manager 20 includes a loan processor module 55, which controls the operation of the custom loan manager 20 with the assistance of the processor 35 and the operating system 60. The operating system 60 enables execution of the loan processor module 55 by the processor 35. The custom loan manager 20 also includes a storage device 65, such as a hard disk drive, which contains files that are utilized by the loan processor module 55 in calculating personalized or customized loan terms. The storage device 65 may contain one or more tables or databases that store customer credit information, such as historical credit information received from credit bureaus, customers, and third parties. The storage device 65 can also store personal data associated with a customer, such as the customer's home address, social security number, home telephone number, and the like, and may also contain data associated with a particular loan or credit account maintained by the customer. It will be appreciated by one of ordinary skill in the art that one or more of the custom loan manager 20 components may be located geographically remotely from other custom loan manager 20 components. Furthermore, one or more of the components may be combined, and additional components performing functions described herein may be included in the custom loan manager 20.

FIGS. 3-8 illustrate the methods implemented by the custom loan manager 20, and more specifically, methods implemented by the loan processor module 55 with the aid of the processor 35 and operating system 60, in generating personalized loan terms for customers. The present invention allows a lender to offer mass customization of loans to customers, such that each customers' loan may be unique in price, amount, and/or terms to that customer. The present invention also considers the volatility of the estimates in its calculation and links customers' price to their risk, which allows a lender to either tighten or loosen credit terms versus the market rather than other benchmarks, such as internal benchmarks. Furthermore, the present invention reduces the subsidies paid by better customers (i.e., customers that pay), which can enhance a lender's market position in the competitive credit market.

Generally, the present invention takes five components into consideration in calculating customized loan terms regardless of the type or category of loan. These components are (1) cost of finds, (2) expected operating expenses, (3) expected credit losses, (4) 'risk' or unexpected credit loses, and (5) excess returns due to active management. The cost of funds, expected operating expenses and expected credit loses are calculated based upon a detailed analysis of a borrower/lender such that these terms are known at the time a customized loan is determined. It should be appreciated that, as opposed to the customer, one example of a borrower/lender is a credit card company which takes a loan from a lender in order to offer credit service. Just as the customer must pay the borrower/lender, the borrower/lender must repay the lender of the funds which allow the credit card company to perform its services. Given these known terms, it is credit (loan) application data and credit bureau data that are utilized by the custom loan manager 20 to determine the final two values, as will be explained in detail below. The premium for unexpected credit loses measures the required return on equity capital assigned to a transaction, and excess returns from management is the excess spread over the minimum price that management can extract from inefficient pricing in the market.

Regardless of the type of loan that is customized, systems, methods and computer program products of the present invention include common calculations and steps required for every type of customizable loan. One such calculation is that which is illustrated in FIG. 3. FIG. 3 shows a block diagram flow chart 70 illustrating the calculation of personalized loan terms given an expected default rate, according to one aspect of the present invention. As stated above, these steps may be performed using computer hardware and/or software, such that each of the steps may be executed on a computer. Likewise, steps requiring the input of data by a customer or third party can be implemented over a computer network, such as a local area network (LAN) or a wide area network such as the Internet. For instance, customers seeking customizable loans may access the present invention, which can operate as computer software resident on a server accessible via the Internet, so that customers in diverse geographical locations can take advantage of the present invention. Therefore, it will be appreciated that the invention may be implemented through the use of one or more graphical user interfaces (GUI) on one or more web pages, wherein the GUIs facilitate the input or transfer of information to systems, methods and computer program products of the present invention, as is well known in the art. Furthermore, it will be appreciated that where the present invention is implemented over a network the invention may collect data or information from one or more third parties, such as credit bureaus, in a format that is usable by the present invention, or may be converted by well known means to a format useable by the present invention.

Referring now to FIG. 3, the calculation of a customized interest rate or annual percentage rate (APR) for a loan given an expected default rate is illustrated. This calculation is made regardless of the type of loan offered to the customer, and is the basis for determining a customized APR for a given customer. As illustrated in FIG. 3, the cost and overhead associated with the funds and loan is initially determined. The cost of funds is the cost incurred by a lender in loaning money to a borrower. For instance, a credit card company incurs costs associated with payment of goods for a customer because the credit card company borrows money, paying interest on the amount borrowed. Therefore, the cost associated with the borrowing of money is the cost of fund in this illustrative example. The cost of funds for one or more transactions (loan calculations) may be input by an operator of the custom loan manager 20, but is preferably automatically accessed by the loan processor module 55 from the storage device 65 or one or more network elements accessible via the network interface. Because the determination of the cost of funds is well known to those of skill in the art, the cost of funds will not be further discussed herein. The overhead associated with a loan is also determined and accessed in a similar manner, and is well known to those of skill in the art. This overhead is the amount that it costs a lender to process the loan, including costs associated with billing for the loan, sending statements to the customer, advertising, and the like. After the cost of funds and overhead are determined (block 70), they are both stored in the memory 50 of the custom loan manager 20 for use in subsequent calculations explained in detail below.

Next, the required return on risk adjusted assets (RORAA) is determined by the loan processor module 55 (block 80). Calculating the RORAA is also well known to those of ordinary skill in the art. However, the following calculations and tables represent an illustrative example of a RORAA calculation given benchmark numbers for a required return on equity (18%), a required return on capital (12.21%), and a 34% tax rate. It should be appreciated that the first step is calculating a minimum profit that is acceptable while at the same time covering the cost of the equity capital assigned to a transaction. The RORAA calculation is based on the capital requirements listed in the Basle accords, and is advantageous for pricing in markets or products where there is insufficient data to calculate the risk based capital requirement.

The following example calculates the absolute minimum spread a typical bank should be willing to accept on a "risk free" loan, based on shareholder return requirements and regulatory capital constraints. It provides a consistent floor for all loan-pricing decisions that will not vary over the credit cycle. This example includes several assumptions, such as: zero losses, maximum leverage (capital equal to 8% of risk adjusted assets, common equity constituting all of Tier 1 capital, and further leveraged through full use of Tier 2 capital), capital is invested in US Treasury securities and is not allocated to individual transactions, and no overhead expenses are assumed.

Table 1 shows an illustrative example of risk weighting, which may be defined by an operator of the loan manager and stored within the storage device 65 for use in computing the RORAA:

TABLE 1

Illustrative Example of Risk Weighting Based on Category of Transactions

| Risk Weighting | Category |
| --- | --- |
| 0% | Cash |
| | Claims on central governments |
| 10% | Claims on domestic public sector entities |
| 20% | General obligations of state and local govt. |
| | Claims on domestic depositary institutions |
| 50% | Revolving credit underwriting agreements |
| | Revenue bonds of state and local governments |
| | Residential mortgages |
| 100% | Commercial Loans |
| | Consumer Loans |
| | Standby letters of credit (for credit enhancement) |

Based on the risk weighting, a risk adjusted balance sheet is created.

TABLE 2

Risk-Based Balance Sheet

| | Actual | Reported | Weighting | Risk Adjusted |
| --- | --- | --- | --- | --- |
| Assets | | | | |
| Investments | 7 | 7 | 0% | 0 |
| Net Loans | 90 | 80 | 100% | 90 |
| Revolving Loans | 20 | | 50% | 10 |
| Total Assets | | 87 | | 100 |
| Capital/Assets Ratio | | 9.20% | | 8.00% |
| Liabilities & Equity | | | | |
| Funding | 80 | | | |
| Subordinated Debt | 1 | | n.b. loan loss reserve = 1 | |
| Preferred Stock | 2 | | | |
| Common Equity | 4 | | | |
| Total | 87 | | | |

Next, the after-tax cost of capital is calculated. This calculation is illustrated in Table 3.

TABLE 3

Calculating Cost of Capital

Cost of Capital Calculations

|  | (1) Amount | pre-tax Cost | (2) After tax Cost (34% Tax Rate) | (1) * (2) Net |
|---|---|---|---|---|
| Tier 1 |  |  |  |  |
| Common Equity | 4 | 0.18 | 0.1800 | 0.7200 |
| Tier 2 |  |  |  |  |
| Loan Loss reserve | 1 | — | — | — |
| Subordinated Debt | 1 | 0.09 | 0.0594 | 0.0594 |
| Preferred Stock | 2 | 0.1 | 0.1000 | 0.2000 |
| Total | 8 |  |  | 0.9794 |
| Weighted Average Cost of Capital = |  | .979/8 = | 12.24% | (after-tax) |

Using this required return on capital and assuming an 8.5% yield on investments, the required return on risk-adjusted assets (RORAA) may be calculated. This calculation is illustrated in Table 4.

TABLE 4

Calculating RORAA
Required Return on Risk Adjusted Assets (RORAA)

Required Return Calculation

| WACC | 12.24% |
| *Capital | 8 |
|  | 0.9794 |
| Pre-tax Yield | 0.085 |
| *(1-tax Rate) | 0.66 |
| *Investments | 7 |
|  | 0.3927 |
| Total Profit Required | 0.9794 |
| (Earnings on | 0.3927 |
| Investments) |  |
| RORAA | 0.5867 |

Since risk-adjusted assets equal 100, the required return is 0.5865 on risk-adjusted assets. Specific pricing minimums can now be established for different classes of loans.

Example 1

Pricing a Loan $$RORAA = \frac{(\text{Pre-tax return}) * (1 - \text{tax rate})}{(\text{nominal amounts}) * (\text{risk weighting})}$$

$$\text{Pre-tax return} = \frac{(RORAA) * (\text{nominal amount}) * (\text{risk weighting})}{(1 - \text{tax} - \text{rate})}$$

$$= \frac{(0.5865) * (1.00) * (1.00)}{(1 - 0.34)}$$

$$= 0.889 \text{ or } 89 \text{ basis points.}$$

Example 2

Pricing a Line of Credit $$\text{Pre-tax return} = \frac{(.5865) * (1.00) * (.50)}{(1 - 0.34)}$$

$$= 0.444 \text{ or } 44 \text{ basis points.}$$

This illustrative example indicates that an absolute minimum of 89 basis points must be earned on loan outstandings and 44 basis points on revolving lines of credit for earnings objectives to be achieved. The pricing will go up if credit risk and operating expense are included. According to one aspect of the invention, in markets having sufficient information to calculate the volatility of the default rate a risk based capital adjustment can be used, wherein capital is assigned to the transaction based on the volatility of the default rate and tolerance for risk.

Referring again to FIG. 3, once the RORAA and required pre-tax return has been calculated by the custom loan manager 20 using the above method, or input into the loan manager 20 by an operator, the required pre-tax return is combined with the cost of funds and overhead (block 85) to determine the risk free rate. Therefore, the Risk Free Rate equals the Cost of Funds plus the Required Return plus the Overhead. Continuing with the hypothetical pre-tax return computed from the RORAA above, and using hypothetical terms for cost of funds and overhead, the Risk Free Rate may be illustrated as follows:

Risk Free Rate = Funding + Required Return + Overhead

= 7.5% + 0.889 + 2.344%

= 10.73%

Finally, given a default rate the required interest rate for a customized loan to return minimum required return on equity can be calculated. In the calculations immediately below the default rate is assumed to be 5%, such that there is assumed a 5% probability that a customer will default on a loan. The computation of the default rate is discussed in great detail with respect to FIGS. 4-8, which describe various computations performed by the loan processing module 55 to determine the default rates, including computations that include the use of credit bureau data, such as credit ratings, in determining default rates. The following formula is used to determine the customized APR for a one year loan:

$$\text{Interest rate} = \frac{(1 + RFR) - ((\text{Default rate}) * (\text{Recovery Rate}))}{(1 - \text{Default Rate})} - 1$$

Assuming a 5% default rate, the following formula is used obtain a customized APR where the recovery rate is 0.2:

$$\text{Interest Rate} = \frac{((1 + .1073) - (.05 * .2))}{.95} - 1$$
$$= 15.39\%$$

This calculation is performed by the loan processor module 55, and solves for an interest rate that produces the same total return, after adjusting for defaults and recoveries, as the return required on a risk-free investment. The credit spread over the risk free rate is the additional yield required to compensate for default risk. Using the computations above the custom loan manager 20 can offer personalized interest rates to customer given a default rate associated with the customer.

FIG. 4 shows a block diagram flow chart illustrating the calculation of personalized loan terms for unsecured installment loans and unsecured lines of credit, according to one aspect of the present invention. As shown in FIG. 4, a customer must first complete a credit application, as are known in the art. Credit applications typically include fields for the purposes of identifying the customer (e.g., social security number, name, address, etc.) the customer's accounts, the customer's income, and like data for the purposes of determining credit worthiness. This information is received (block 100) by the custom loan manager 20 of the present invention, either automatically or through a manual process. For instance, the credit application may be an electronic application located at one or more websites, and the credit data transferred to the system of the present invention. Next, the present invention pulls or accesses credit data from one or more third parties, such as credit bureaus (e.g., Equifax, Experian, and TransUnion), as are well known in the art (block 105). This information preferably includes a customer's credit score and a default rating that indicates the probability that the customer will default on a loan. Additionally, this data can include data related to the customer's identity, credit checks run on the customer by potential lenders, public record information, collection data, and the like. Additionally, any information about the customer stored within the custom loan manager about the customer may also be accessed (block 105). After credit application data, third party data (e.g., credit bureau data) and stored customer information data is accessed, the information is preferably temporarily stored in memory 50. Alternatively, the information may be stored in the storage device 65. From the credit application and credit bureau data an expected default rate for the customer may be calculated, as is well known in the art. According to one aspect of the invention, the expected default rate can be based entirely upon credit bureau data, which may indicate a probability of default for a loan to a customer based on credit rating information and national averages or historical and/or projected statistics for similarly situated customers. According to another aspect of the invention, the expected default rate may be based in part upon credit bureau data and credit application data, such as the customer's income. Additionally, separate default rates may be taken based upon information received from one or more credit bureaus, and combined with default rate information based on credit application data or received from third parties. Moreover, different default rates for a customer may be weighted and combined to generate an accurate expected default rate, or a worst-case scenario default rate may be determined. It is preferable that the loan processor module 55 calculate an expected default rate based at least upon credit bureau data and customer credit application data, where the loan processor module computes an weighted average based upon data typically utilized in the computation of default rates. According to one aspect of the invention, the default rate information can be combined based upon Bayes Theorem, which results in a combined default rate.

In addition to calculating an expected default rate (block 110), the custom loan manager 20 also calculates the risk from the customer due to the customer's debt burden. This is another measurement of the likelihood that the customer will default on a loan. To perform this calculation, objective data, such as the customer's income, is used in conjunction with the Blacksholes Model for computing default risk, which is well known in the art. For instance, it may be assumed that a loan will default if the amount owed by the customer is larger than the customer's income. An illustrative computation of the probability of default from debt burden is illustrated in Table 5:

TABLE 5

Computing Probability of Default From Debt Burden
The probability of default from debt burden

| | |
|---|---|
| Amount of Loan | 20 |
| RFR | 10.73% |
| Income | 95 |
| Default rate | 5% |
| Recovery rate | 20% |
| Risk | 1.53 |
| Fexp(−rT) = | = 17.97 |
| a1 = (−ln(V0/F) − (r − s^2/2)T)/s@sqrt(t) | = −1.6500 |
| a2 = a1 − s * sqrt(T) | = −3.1800 |
| N(a1) | = 0.0495 |
| N(a2) | = 0.0007 |
| P0 = Fexp(−rT)N(a1) − V0N(a2) | = 0.8188 |
| B0 = Fexp(−rT) − P0 | = 17.15 |
| Interest Rate = ln(Amount/B0) | = 15.40% |
| Spread = | = 4.67% |

Because it is assumed that a loan will default if the amount owed is larger than income, the risk from debt burden is a function of the debt burden and the volatility of a customer's income. The debt burden is known, while the volatility is calculated using government statistics on income movements. Table 6 shows an illustrative income movement matrix:

TABLE 6

Income Matrices

Transition Matrix of Income Quintiles

| | 1 | 2 | 3 | 4 | 5 | |
|---|---|---|---|---|---|---|
| 1 | 90.6% | 5.2% | 2.4% | 1.4% | 0.4% | 100.0% |
| 2 | 5.0% | 87.0% | 4.4% | 2.4% | 1.2% | 100.0% |
| 3 | 2.2% | 4.2% | 87.0% | 4.4% | 2.2% | 100.0% |

TABLE 6-continued

Income Matrices

| | | | | | | |
|---|---|---|---|---|---|---|
| 4 | 1.4% | 2.4% | 4.0% | 87.6% | 4.6% | 100.0% |
| 5 | 0.8% | 1.2% | 2.2% | 4.2% | 91.6% | 100.0% |
| | 100.0% | 100.0% | 100.0% | 100.0% | 100.0% | |

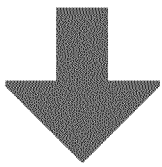

Transition Matrix Translated into Cumulative Annual Volatility

| | 1 | 2 | 3 | 4 | 5 | 6 | 7 |
|---|---|---|---|---|---|---|---|
| 1 | 25.10% | 29.36% | 32.19% | 34.17% | 35.57% | 36.59% | 37.31% |
| 2 | 6.81% | 8.91% | 10.68% | 12.18% | 13.47% | 14.56% | 15.51% |
| 3 | 2.45% | 3.22% | 3.88% | 4.45% | 4.93% | 5.35% | 5.70% |
| 4 | 0.33% | 0.34% | 0.30% | 0.26% | 0.28% | 0.38% | 0.54% |
| 5 | 3.91% | 5.40% | 6.82% | 8.17% | 9.45% | 10.67% | 11.82% |

Given these income volatility figures for any given debt burden, the loan processor module 55 computes the probability of default from debt burden using Blacksholes Model.

Referring again to the flowchart of FIG. 4, after the risk from debt burden is calculated (block 115) in the manner specified above, the required return under regulatory capital is computed (block 125). As described in detail above, the required return under regulatory capital is required, in addition to funding costs and overhead, to determine the risk free rate, which in turn is required to determine a customized loan term that delivers a minimum return on equity for a lender based in part upon the likelihood that the customer will default on the loan. Where there is a developed market, the volatility of the default rate may be calculated and a risk based capital adjustment can be determined (block 135), where capital is assigned to the transaction based on the volatility of the default rate and tolerance for risk. In markets that are not developed, a final price is calculated (block 140) using the method indicated at block 90 of FIG. 3.

As discussed above, the calculation by the loan processing module 55 of the expected default rate (block 110) and/or risk from debt burden (block 115) may be used as the default rate in determining the interest rate for a customer's customized loan. According to one aspect of the invention, the loan processing module 55 calculates an interest rate base solely on the expected default rate. According to another aspect of the invention, the loan processing module calculates an interest rate based entirely upon the risk from debt-burden. According to yet another aspect of the invention the loan processing module calculates an interest rate based upon the default rate provided by the credit bureau. However, because each of these taken alone is less reliable than the combination of the default measurements, it is preferred that at least two of the techniques are combined by the loan processor module 55 using a weighted average technique such as Bayes Theorem. Referring again to FIG. 4, the calculation of a combined, adjusted or averaged default rate is illustrated as optionally occurring at block 120 to indicate that the loan processing module may optionally be configured to adjust the default rate such that it is based upon more than one default rate determination.

FIG. 5 shows a block diagram flow chart 145 illustrating the calculation of personalized loan terms for loans secured by cash, according to one aspect of the present invention. As in the process illustrated in FIG. 4, a credit application is received from a customer (block 150), and third party information or data is collected or accessed, as is locally stored customer information or data (block 160). Similarly, as in block 110 of FIG. 4, an expected default rate and the risk from debt burden are each calculated (blocks 160, 165) by the loan processor module 55. Next, the loan processor module 55 computes an expected recovery on a loan default (block 170) considering expenses for collecting on the default. This value is calculated as 90% of the cash deposit. However, it should be appreciated that this value is arbitrary and can be varied. Next, as in the process discussed with respect to FIG. 4, an adjusted default rate may be calculated. According to one preferred aspect of the invention, where a loan is secured by cash the adjusted default rate is calculated as a weighted average of the debt burden, credit bureau supplied default probability or score and recovery rate (block 175).

As in FIG. 4, after the adjusted default rate is calculated (block 175), the required return under regulatory capital is computed (block 180). As described in detail above, the required return under regulatory capital is required, in addition to funding costs and overhead, to determine the risk free rate, which in turn is required to determine a customized loan term that delivers a minimum return on equity for a lender based in part upon the likelihood that the customer will default on the loan. Where there is a developed market, the volatility of the default rate may be calculated and a risk based capital adjustment can be determined (block 190), where capital is assigned to the transaction based on the volatility of the default rate and tolerance for risk. Regardless of whether a capital adjustment is used, a final price (e.g., interest rate) is calculated (block 190) using the method indicated at block 90 of FIG. 3 and offered to the customer.

FIG. 6 shows a block diagram flow chart 200 illustrating the calculation of personalized loan terms for loans secured by securities and loans secured by real property, according to one aspect of the present invention. It will be appreciated that the process performed by the system of the present invention in calculating customized loan terms for loans secured by securities and loans secured by real property is largely identical to the process for calculating customized loan terms for loans secured by cash, but for the step of calculating a recovery value, which is more speculative than recovering a percentage of a cash deposit. Therefore, like the process of FIG. 5, a credit application is received from a customer (block 205), and third party information and stored customer information is accessed (block 210). After an expected default rate (block 215) and risk from debt burden is calculated (block 220), the recover value is calculated (block 225). Calculation of recovery value is discussed in detail with reference to FIGS. 7 and 8. After the recovery value is calculated, an adjusted default rate is calculated (block 230) in the same manner as in block 175 of FIG. 5. Thereafter the required return under regulatory capital is calculated (block 235), and a final price is calculated (block 250), which may take in consideration volatility of the default rate by calculating RORAC using the required return (block 245).

FIG. 7 shows a block diagram flow chart 255 illustrating the calculation of recovery value for loans secured by securities, according to one aspect of the present invention. The purpose of the calculation of recovery value is to value the loan collateral for purposes of pricing loan terms. This is performed by calculating the potential drawdown of a portfolio using the variance of the asset price and the correlation among the assets. In this process the first step is inputting the portfolio composition (block 260). Thereafter the volatility of returns for each asset is calculated as is its correlation with the other assets (blocks 265 and 270). These figures are then used to estimate the value as collateral of each individual customer's portfolio. An illustrative example of this process is shown in Table 7 below, with the assets comprising stocks 'MSFT', 'LMS' and 'AJG':

TABLE 7

Historical Volatility of Stock Assets

| Asset | Weight | Volatility |
|---|---|---|
| MSFT | 33.33% | 152.57% |
| LMS | 33.33% | 38.69% |
| AJG | 33.33% | 49.88% |
| Total | 100% | |

TABLE 7-continued

Historical Volatility of Stock Assets

| Asset | Weight | Volatility | | |
|---|---|---|---|---|
| Correlation | | | | |
| 1,2 | −20.65% | | | |
| 1,3 | 89.05% | | | |
| 2,3 | −25.18% | | | |
| Value of Portfolio | 10000 | | | |
| Confidence Level | NA | | | |
| Volatility Matrix | | | | |
| | 1.52565496 | 0 | | 0 |
| | 0 | 0.38688089 | | 0 |
| | 0 | 0 | | 0.49881863 |

Given these historical volatility figures, which are calculated by the loan processor module 55 according to well known methods, the expected volatility of the portfolio can be computed. A confidence level for each category of transaction is set as a multiple of the volatility. For example if the loan processor 55 is set to have 95% confidence that the collateral calculation is correct, the Volatility is multiplied by 1.645.

| Confidence Level | 95% | | | | | |
|---|---|---|---|---|---|---|
| Number of STD's | 1.644853 | | | | | |
| | MSFT | LMS | AJG | Correlation Matrix | | |
| Volatility Matrix | | | | | | |
| MSFT | 250.95% | 0.00% | 0.00% | 1 | −0.20649 | 0.89047 |
| LMS | 0.00% | 63.64% | 0.00% | −0.20649 | 1 | −0.25184 |
| AJG | 0.00% | 0.00% | 82.05% | 0.89047 | −0.25184 | 1 |
| VC Matrix | 2.50947814 | −0.5181779 | 2.23462695 | | | |
| | −0.1314014 | 0.6363622 | −0.160264 | | | |
| | 0.73061969 | −0.2066338 | 0.82048332 | | | |
| VCV Matrix | | | | | | |
| | 6.29748053 | −0.3297489 | 1.83347413 | | | |
| | −0.3297489 | 0.40495685 | −0.131494 | | | |
| | 1.83347413 | −0.131494 | 0.67319287 | | | |
| VAR Matrix | | | | | | |
| Weighting Matrix | 33.33% | 33.33% | 33.33% | | | |
| | | | | WVCVW | | |
| WVCV Matrix | 260.04% | −1.88% | 79.17% | 112.45% | | |
| | | Diversified Volatility | | 106.04% | | |
| | | Undiversified Volatility | | 132.21% | | |

Thus, the volatility of this portfolio as collateral is 106%. The Merton model and Blacksholes Model described above with respect to FIG. 4 are then used by the loan processor module 55, with reference to tables stored within the storage device 65, to calculate the expected recovery for each level of coverage (block 270). The recovery rates and associated risks (or default rates) for each level of coverage are illustrated in Table 8 for the above example. The default rates in the table are used by the loan processor module 55 in computing the interest rates for each loan having a specified asset portfolio.

TABLE 8

Recovery Rates and Risks For Portfolio

| Margin | 10.00% | 20.00% | 30.00% | 40.00% | 50.00% | 60.00% | 70.00% | 80.00% | 90.00% | 100.00% |
|---|---|---|---|---|---|---|---|---|---|---|
| Term | 1 | 1 | 1 | 1 | 1 | 1 | 1 | 1 | 1 | 1 |
| Variance | 106.0% | 106.0% | 106.0% | 106.0% | 106.0% | 106.0% | 106.0% | 106.0% | 106.0% | 106.0% |
| N(1) | −1.64122 | −0.98756 | −0.60519 | −0.3339 | −0.12346 | 0.04847 | 0.19384 | 0.31977 | 0.43084 | 0.5302 |
| N(2) | −2.70163 | −2.04796 | −1.66559 | −1.3943 | −1.18387 | −1.01193 | −0.86656 | −0.74063 | −0.62956 | −0.5302 |

TABLE 8-continued

Recovery Rates and Risks For Portfolio

| Risk | 0.345% | 2.028% | 4.790% | 8.161% | 11.823% | 15.579% | 19.309% | 22.946% | 26.449% | 29.799% |
|---|---|---|---|---|---|---|---|---|---|---|
| Recovery Rate | 99.655% | 97.972% | 95.210% | 91.839% | 88.177% | 84.421% | 80.691% | 77.054% | 73.551% | 70.201% |

FIG. 8 shows a block diagram flow chart 280 illustrating the calculation of recovery value for loans secured by real property, according to one aspect of the present invention. For mortgages, the same general approach is utilized as was outlined with reference to FIG. 7, but for the inclusion of carrying costs and repossession expenses in the calculation. These costs and expenses must be retrieved by the loan processor (block 300) module 55 from databases within the storage device 65, or from third parties via the network interface 70. Using tables for home values, the expected recovery rate for different loan to value (LTV) ratios (blocks 285, 295, 305) can be calculated by the custom loan manager 20 using the methods described in FIG. 7, above. This provides a measure of risk, or a default rate, for different loan to value ratios, which allows for the calculation of interest rates, as detailed with reference to FIG. 4. For instance, the loan processor module 55 calculates the expected recovery rate in the following example, which illustrates recovery rates for different loan to value rations for a home with a value of £100,000 located in the London suburbs (with a historical volatility of 7.1%):

TABLE 9

Risk and Recovery Rates For Real Property

| | | | | | | |
|---|---|---|---|---|---|---|
| Loan Amount | 30,000 | 40,000 | 50,000 | 60,000 | 70,000 | 80,000 |
| House Value | 100,000 | 100,000 | 100,000 | 100,000 | 100,000 | 100,000 |
| LTV | 30.00% | 40.00% | 50.00% | 60.00% | 70.00% | 80.00% |
| Term | 30 | 30 | 30 | 30 | 30 | 30 |
| Req Return | 0.00% | 0.00% | 0.00% | 0.00% | 0.00% | 0.00% |
| COF | 0 | 0 | 0 | 0 | 0 | 0 |
| Variance | 7.1% | 7.1% | 7.1% | 7.1% | 7.1% | 7.1% |
| Variance ^ 2 | 0.5% | 0.5% | 0.5% | 0.5% | 0.5% | 0.5% |
| Fexp(-rT) | 30000.00 | 40000.00 | 50000.00 | 60000.00 | 70000.00 | 80000.00 |
| A1 | -2.901535 | -2.16177 | -1.587964 | -1.11913 | -0.722736 | -0.379365 |
| A2 | -3.290418 | -2.550653 | -1.976847 | -1.508013 | -1.11162 | -0.768248 |
| Risk | 0.050% | 0.538% | 2.403% | 6.578% | 13.315% | 22.117% |
| Recovery Rate | 99.950% | 99.462% | 97.597% | 93.422% | 86.685% | 77.883% |

Each of the block diagram flow charts illustrate an offer made to a customer from the custom loan manager after the calculation of a customized loan based upon the probability of default, which in the secured loan scenarios discussed above is directly related to the value of collateral and the cost for recovering value for that collateral. However, if the customer does not wish to accept a loan term provided by the custom loan manager 20 to the customer, such as via a web page, the customer can request that the loan terms be recalculated by the custom loan manager 20. Thereafter the custom loan manager 20 can change one or more values, such as the loan term. Additionally, the custom loan manager 20 will allow the customer to input a yearly fee (as collateral) or change the value of the loan, which may result in the calculation of a lower default rate, less overhead, or other terms that may result in advantageous pricing of the interest rate. Preferably the custom loan manager 20 allows a customer to enter multiple scenarios (e.g., different loan values, yearly fees, etc.) so that the customer can obtain beneficial loan terms.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for determining individually customized loan terms for a customer, comprising:
   accepting customer credit application data corresponding to the customer;
   accessing credit bureau data corresponding to the customer, wherein the credit bureau data contains a credit rating for the customer;
   calculating a weighted expected probability of default for a loan to the customer based at least in part upon weighting a first expected probability of default and a second expected probability of default, wherein each the first expected probability and the second expected probability are based on the customer credit application data and the credit bureau data;
   calculating a risk from debt burden of the customer based at least in part upon a volatility of income determined from government statistics on aggregate income movements of a population
   calculating a risk free rate; and
   determining customized loan terms that are above the risk free rate,
   wherein said customized loan terms deliver a predetermined minimum return on equity for a lender, and said customized loan terms are based at least in part upon the weighted expected probability of default, a capital structure of the lender, and funding rates available to the lender.

2. The method of claim 1, wherein the determining of customized loan terms includes determining a required return on capital for the lender and calculating a required return on risk-adjusted assets (RORAA) for the lender.

3. The method of claim 2, wherein the accessing of credit bureau data corresponding to the customer includes receiving credit bureau data representing the likelihood for the customer to default on a loan.

4. The method of claim 1, wherein the determining of customized loan terms includes determining customized loan terms for an unsecured loan to the customer.

5. The method of claim 1, wherein calculating a weighted expected probability is based at least in part upon the risk from debt burden of the customer.

6. The method of claim 1, wherein the determining of customized loan terms includes determining customized loan terms based at least in part upon an overhead incurred by the lender.

7. A system comprising a processor,
a tangible, non-transitory memory communicating with a processor for determining individually customized loan terms for a customer,
the tangible, non-transitory memory having instructions stored thereon that, in response to execution by the processor, cause the processor to perform operations comprising:
  communicating, by the processor, with a credit bureau over an electronic communication medium; communicating with a customer computer;
  receiving, by the processor and from the customer computer, customer credit application data corresponding to a customer;
  accessing, by the processor and from the credit bureau over the electronic communication medium, credit bureau data corresponding to the customer;
  calculating, by the processor, a weighted expected probability of default for a loan to the customer based at least in part upon weighting a first expected probability of default and a second expected probability of default, wherein each the first expected probability and the second expected probability are based on the customer credit application data and the credit bureau data;
  calculating, by the processor, a risk from debt burden of the customer based at least in part upon a volatility of income determined from government statistics on aggregate income movements of a population,
  calculating, by the processor, a risk free rate; and
  determining, by the processor, customized loan terms that are above the risk free rate,
  wherein said customized loan terms deliver a predetermined minimum return on equity for a lender, and said customized loan terms are based at least in part upon the weighted expected probability of default, a capital structure of the lender, and funding rates available to the lender.

8. The system of claim 7, wherein the communicating with the customer computer occurs via the Internet.

9. The system of claim 8, wherein the control logic includes instructions for communicating with a lender computer.

10. An article of manufacture including a non-transitory, tangible computer readable medium having instructions stored thereon that, in response to execution by a computer-based system for determining individually customized loan terms for a customer, cause the computer-based system to perform operations comprising:
  accepting, by the computer-based system, customer credit application data corresponding to the customer;
  accessing, by the computer-based system, credit bureau data corresponding to the customer, wherein the credit bureau data contains a credit rating for the customer;
  calculating, by the computer-based system, a weighted expected probability of default for a loan to the customer based at least in part upon weighting a first expected probability of default and a second expected probability of default, wherein each the first expected probability and the second expected probability are based on the customer credit application data and the credit bureau data;
  calculating, by the computer-based system, a risk from debt burden of the customer based at least in part upon a volatility of income determined from government statistics of aggregate income movements of a population;
  calculating, by the processor, a risk free rate; and
  determining, by the computer-based system, customized loan terms that are above the risk free rate,
  wherein said customized loan terms deliver a predetermined minimum return on equity for a lender, and said customized loan terms are based at least in part upon the weighted expected probability of default, a capital structure of the lender, and funding rates available to the lender.

11. The article of claim 10, wherein the calculating a risk from debt burden further comprises calculating a required return on risk-adjusted assets (RORAA) for the lender.

12. The article of claim 11, wherein the calculating a weighted probability further comprises an expected probability of default for a loan to the customer based at least in part upon credit bureau data representing the likelihood for the customer to default on a loan.

13. The article of claim 10, wherein the determining customized loans terms is for an unsecured loan to the customer.

14. The article of claim 10, wherein the determining customized loans terms is based at least in part upon the risk from debt burden of the customer.

* * * * *